Dec. 14, 1937. C. W. CRUMRINE 2,101,986
SELF ERECTING FRONT CAMERA
Filed April 1, 1937 2 Sheets-Sheet 1

Chester W. Crumrine, INVENTOR
BY
ATTORNEYS.

Dec. 14, 1937.  C. W. CRUMRINE  2,101,986
SELF ERECTING FRONT CAMERA
Filed April 1, 1937   2 Sheets-Sheet 2
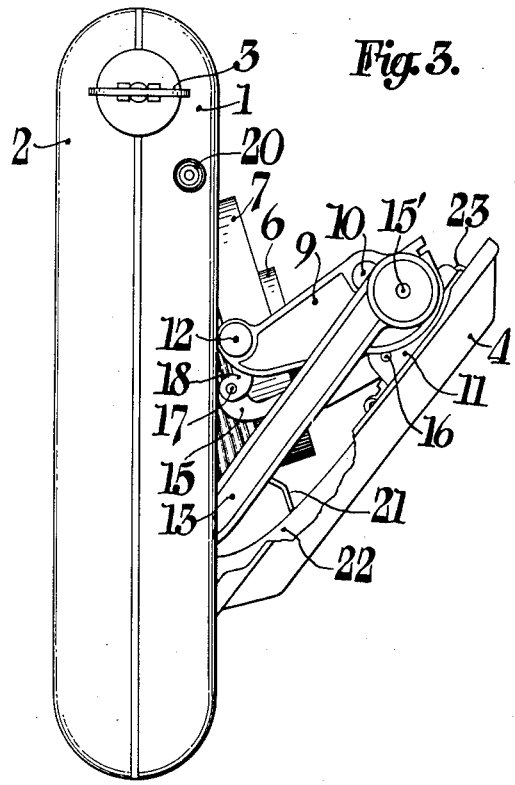
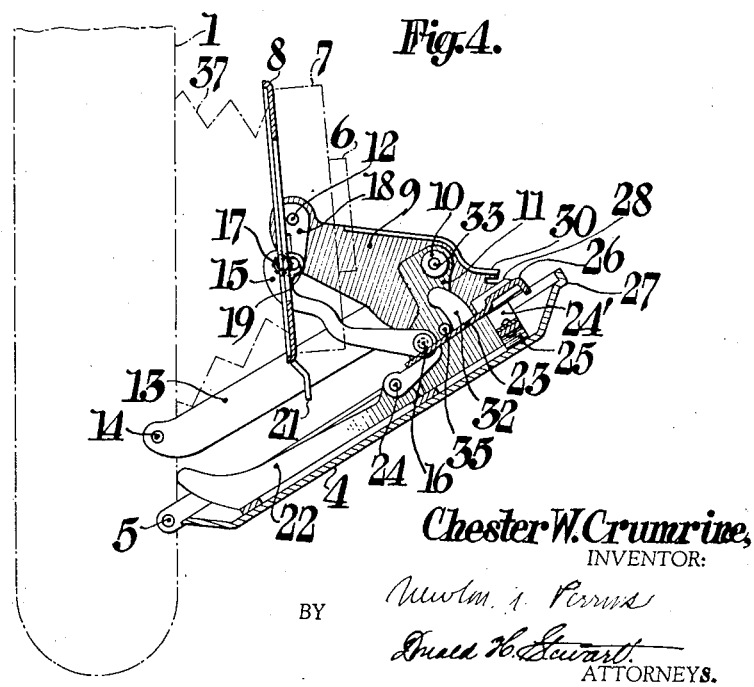
Chester W. Crumrine,
INVENTOR:
BY
ATTORNEYS.

Patented Dec. 14, 1937

2,101,986

UNITED STATES PATENT OFFICE 2,101,986

SELF-ERECTING FRONT CAMERA

Chester W. Crumrine, Rochester, N. Y., assignor to Eastman Kodak Company, Rochester, N. Y., a corporation of New Jersey Application April 1, 1937, Serial No. 134,371

7 Claims. (Cl. 95—40)

This invention relates to photography, and more particularly to photographic cameras.

One object of my invention is to provide a camera of the self-erecting front type with an improved form of latching mechanism for holding the camera objective rigidly in an operative or a picture-taking position. Another object of my invention is to provide a movably mounted latching plate having fixed latching elements adapted to cooperate with parts of the lens supporting structure to hold it in an erect or picture-taking position. Still another object of my invention is to provide a linkage for supporting the lens front which is adapted to guide the front through a suitable path of movement in opening and closing the camera, and other objects will appear from the following specification, the novel features being particularly pointed out in the claims at the end thereof.

The self-erecting front mechanism shown in the present application is for an improvement over the erecting mechanism shown in Patent No. 1,974,655, Nagel, granted September 25, 1934.

Coming now to the drawings wherein like reference characters denote like parts throughout:

Fig. 3 is a side elevation of the camera shown in Fig. 1, but with the parts in a partially closed position.

Fig. 4 is a fragmentary sectional view with parts omitted showing the relation of the erecting parts when the camera has been partially opened.

Figure 1:
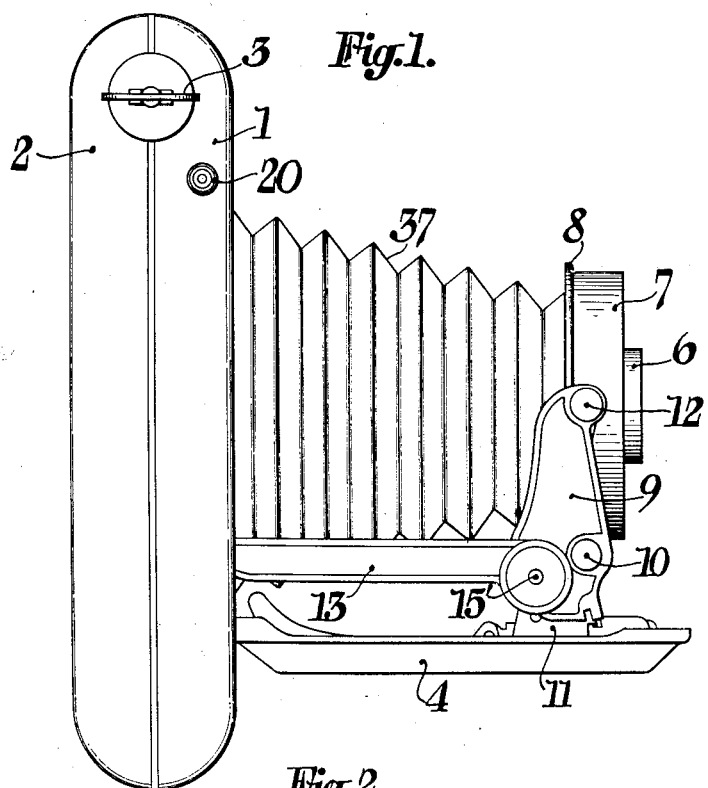
Fig. 1 is a side elevation of a camera utilizing a self-erecting front mechanism constructed in accordance with and embodying a preferred form of my invention.

In accordance with my present invention, a self-erecting front mechanism may be used on a roll film camera which may include a body 1, having a removable back 2, a winding key 3 and a camera bed 4 which is hingedly attached at 5 to the camera body 1. The objective may be contained in the usual lens cells, one of which, 6, is shown in Fig. 1, this lens cell being mounted on the usual shutter 7 which may be supported upon a lens board 8.

Figure 2:
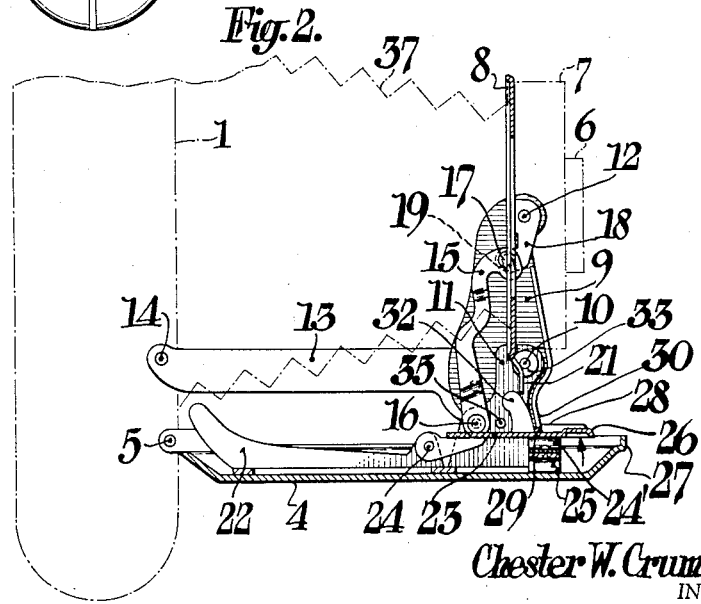
Fig. 2 is a fragmentary sectional view of the camera shown in Fig. 1 with parts omitted for the sake of clearness.

As indicated in Fig. 2, the lens board 8 is preferably mounted on lens board supporting arms 9, each of which is pivoted at 10 to a bracket 11, carried by the camera bed 4. These arms 9 are pivotally attached at 12 to the lens board, so that the lens board may swing upon the pivots 12 in opening and closing the camera. A swinging movement of the lens board supporting arms 9 is obtained through the braces 13 on each side of the camera, each of which is pivotally attached at 14 to the camera body 1 and pivotally attached at 15' to the lens board supporting arms 9. Thus, when the camera bed 4 is moved about its hinge pintle, the braces 13 cause the arms 9 to turn about their pivots 10 into a position in which they will lie adjacent the camera bed 4.

In order to move the lens board 8 through the proper path, I provide a second pair of lens board supporting arms 15 which are pivotally attached at 16 to the brackets 11 on the camera bed 4, and which are also pivotally attached at 17 to arms 18 which are integral with the lens board. It should be noted that the pin 17 passes through a slot 19 in the lens board arms 18, so that a limited amount of play is permitted between the brace 15 and the lens board 8. In opening the camera, the bed release button 20 may be pressed, releasing a standard form of latch, not shown, and permitting the bed to turn outwardly into the position shown in Fig. 1. As the bed moves downwardly, the arms 15 and 9 control the position of the lens board 8 and cause it to move through a path which is substantially parallel to the camera body. Since the pivotal points 17 and 12 are spaced from each other, and since the pivotal points 16 and 10 are also spaced from each other, it will be seen that the movement of the lens board is not exactly parallel to the camera body throughout its range of movement.

There is a certain amount of play in the lens board relative to the arms 15, due to the pin and slot connection 17—19. In closing the camera, this slight play is made use of, because the lens board is provided with a pair of downwardly extending arms 21 which lie opposite a pair of fixed guide rails 22, carried by the bed 4, these guide rails being adapted to guide the lens board through the latter part of its closing movement and, if necessary, through the first part of the opening movement of the camera.

Referring to Fig. 3, it will be seen that these downwardly extending arms 21 engage the fixed rails 22, and consequently, as the bed 4 is pushed inwardly to close the camera from the position shown in this figure, the guide rails will guide the lens board into place in the camera body.

It is desirable to latch the lens board in the position shown in the first two figures and to hold the lens board as rigidly as possible in this position. In order to accomplish this, I provide a latch element 23 which is pivotally attached at 24 near the end of the guide rails 22, so that it may swing about the pivot 24 to and from the bed. Beneath the outer end of this latch element 23, there is a spring member 24' which is attached to a bracket 25. This spring normally tends to thrust the latch member upwardly towards the objective, in the direction shown by the arrow in Fig. 2. A finger release button 26 is preferably provided on the center of the latching element, so that the latch may be released by merely depressing the latch element 23 by pressure on this button 26, which is preferably arranged opposite the center of the end 27 of the bed.

The latch element has two latching portions which engage with two latching portions of the self-erecting front mechanism. The first pair of latching elements 28 are in the form of short rails which are notched at 29, these notches being adapted to engage the turned-over flange 30 of the lens board supporting arms 9 when these arms reach an erect position. The idea of the rails 29 is that until the arms 9 reach an erect position, the ends of the turned-over members 30 will ride on the tops of the rails and will only become latched when they drop in the notches, as indicated in Fig. 2.

The second set of latch elements are turned-up lugs 32, these lugs being also fixedly carried by the latching plate 23. The lugs 32 are rounded at the top and are adapted to engage the downwardly extending arms 21 of the lens board—the same arms which engage the guide rails 22 on the camera body when the camera is being folded. The latch elements 32 press these arms forwardly against rearwardly extending pins 33 which may be conveniently formed as an inner part of the pivot members 10, on which the arms 9 may turn. Thus, the latching plate 23 is held downwardly against the pressure of spring 24 until the end 30 of the arms 9 come opposite the notch 29 in the slotted rails. As soon as this position is reached, as shown in Fig. 2, the spring 24 thrusts upwardly against the latch element 23 and causes both of these latch elements to engage the corresponding latching elements on the lens board and on the lens board supporting arms.

In order to release this latch, the finger piece 26 may be depressed so that the elements 32 and the notch 24 will release the arms 21 and the turned-over flanges 30. The camera may then be closed by swinging the bed about its pivot 5, causing the arms 21 to come in contact with the rails 22 and to guide the lens board into place inside of the camera body.

When the parts are in a partially folded position, it is necessary to prevent the spring-pressed latch member 32 from turning too far about its pivot 24. This is accomplished by providing a pair of pins 35 extending inwardly from the bracket members 11 into the path of the plate 23. Thus, as soon as the finger piece 26 is released, the spring 24 will thrust this member upwardly until these pins are engaged.

It should be noted with this construction, that the camera does not, to any extent, depend upon the bellows 37 to guide the lens board 8 through the proper path in both opening and closing. When the camera has once been opened, the arms which erect the lens board 8, are automatically latched in an erect position, and when this latching takes place, the arms which extend downwardly from the lens board are likewise latched to hold the front in an erect position. Moreover, as will be indicated in Fig. 2, as the parts reach an erect position, the pins 17 latch the ends of the slots 19 so that the arms 15 also tend to hold the pivotal points 17 and 16 rigidly in position, although the arms 15 in themselves are not actually latched in this erect position.

The braces 13 serve for erecting the lens board when the camera bed is moved to its open position. When the lens board supporting arms are definitely latched in position, the braces 13 definitely hold the bed in this open position.

What I claim and desire to be secured by Letters Patent of the United States is:

1. A folding camera of the self-erecting front type comprising, in combination, a camera body, a bed hingedly attached thereto, a lens board, arms supporting said lens board hingedly attached to the bed and lens board, braces pivotally attached to the camera body and arms for moving the camera parts to and from an erect picture taking position, a latching mechanism for retaining the camera parts in an erect or picture taking position comprising a latching member on the camera bed, latching elements on the lens board and lens board supporting arms adapted to be engaged by cooperating latching elements on said latching member moveably mounted on the camera bed and spring pressed toward an operative latching position.

2. A folding camera of the self-erecting front type comprising, in combination, a camera body, a bed hingedly attached thereto, a lens board, arms supporting said lens board hingedly attached to the bed and lens board, braces pivotally attached to the camera body and arms for moving the camera parts to and from an erect picture taking position, a latching mechanism for retaining the camera parts in an erect or picture taking position comprising a latching member on the camera bed, latching elements on the lens board and lens board supporting arms adapted to be engaged by cooperating latching elements on said latching member moveably mounted on the camera bed and spring pressed toward an operative latching position and stop pins to limit the movement of the spring pressed latching member under the impulse of its spring when said parts are in a folded or inoperative position.

3. A folding camera of the self-erecting front type comprising, in combination, a camera body, a bed hingedly attached thereto, a lens board, arms supporting said lens board hingedly attached to the bed and lens board, braces pivotally attached to the camera body and arms for moving the camera parts to and from an erect picture taking position, a latching mechanism for retaining the camera parts in an erect or picture taking position comprising a latching member on the camera bed hingedly attached to the bed having a portion thereof spring pressed away from said bed, stops limiting the movement of the member under the influence of its spring, a pair of spaced upwardly projecting lugs adapted to engage the lens board, and a pair of notched rails adapted to engage said lens board supporting arms, and a handle on said hinged latching member adapted to simultaneously disengage both sets of latching elements.

4. A folding camera of the self-erecting front type comprising, in combination, a camera body, a bed hingedly attached thereto, a lens board, arms supporting said lens board hingedly attached to the bed and lens board, braces pivotally attached to the camera body and arms for moving the camera parts to and from an erect picture taking position, a latching mechanism for retaining the camera parts in an erect or picture taking position comprising a latching member on the camera bed hingedly attached to the bed having a portion thereof spring pressed away from said bed, stops limiting the movement of the member under the influence of its spring, a pair of spaced upwardly projecting lugs adapted to engage the lens board, and a pair of notched rails adapted to engage said lens board supporting arms, and a handle on said hinged latching member adapted to simultaneously disengage both sets of latching elements, a pair of spaced rails on the camera bed extending from an edge of the hinged mounted latching elements, said rails being adapted to guide that portion of the lens board which may be engaged by the latching element as the lens board moves to and from an erect picture taking position.

5. A folding camera of the self-erecting front type, comprising, in combination, a camera body, a bed hingedly attached thereto, a pair of spaced rails carried by the bed, arms pivotally attached to the bed, a lens board pivotally carried by the arms and including a pair of spaced downwardly extending projections adapted to contact with the spaced rails carried by the bed, braces pivotally attached to the camera body and the lens board hold arms for moving the erecting mechanism to and from an operative picture taking position and means for holding the parts in the last mentioned position including a latching element hingedly attached to the bed, and a plurality of latching members carried thereby adapted to engage the downwardly extending projections on the lens board, and adapted to engage the lens board supporting arms to prevent said arms from turning about their pivots.

6. A folding camera of the self-erecting front type, comprising, in combination, a camera body, a bed hingedly attached thereto, a pair of spaced rails carried by the bed, arms pivotally attached to the bed, a lens board pivotally carried by the arms and including a pair of spaced downwardly extending projections adapted to contact with the spaced rails carried by the bed, braces pivotally attached to the camera body and the lens board hold arms for moving the erecting mechanism to and from an operative picture taking position and means for holding the parts in the last mentioned position including a latching element hingedly attached to the bed, and a plurality of latching members carried thereby adapted to engage the downwardly extending projections on the lens board, and adapted to engage the lens board supporting arms to prevent said arms from turning about their pivots and links pivotally attached to the lens board and bed adjacent the lens board supporting arms adapted to move the lens board thru a predetermined path in opening and closing the camera.

7. In a camera of the self-erecting front type, the combination with a camera body, of a bed hinged thereto, a lens board, a pair of arms supporting the lens board pivoted to the bed and lens board, a second pair of arms adjacent the first arms for directing movement of the lens board, said second pair of arms being pivotally attached to the lens board and to the bed at points spaced from the pivots of the first pair of arms, braces pivoted to the first pair of arms and to the camera body, and a latch hingedly attached to the camera bed and adapted to move to and from locking engagement with the lens board and the first supporting arms therefor, for locking and releasing the front board, the first and second pairs of lens board supporting arms guiding movement of the lens board between open and closed positions.

CHESTER W. CRUMRINE.